T. A. EDISON.
MANUFACTURE OF PORTLAND CEMENT.
APPLICATION FILED MAY 8, 1906.
1,059,661.
Patented Apr. 22, 1913.
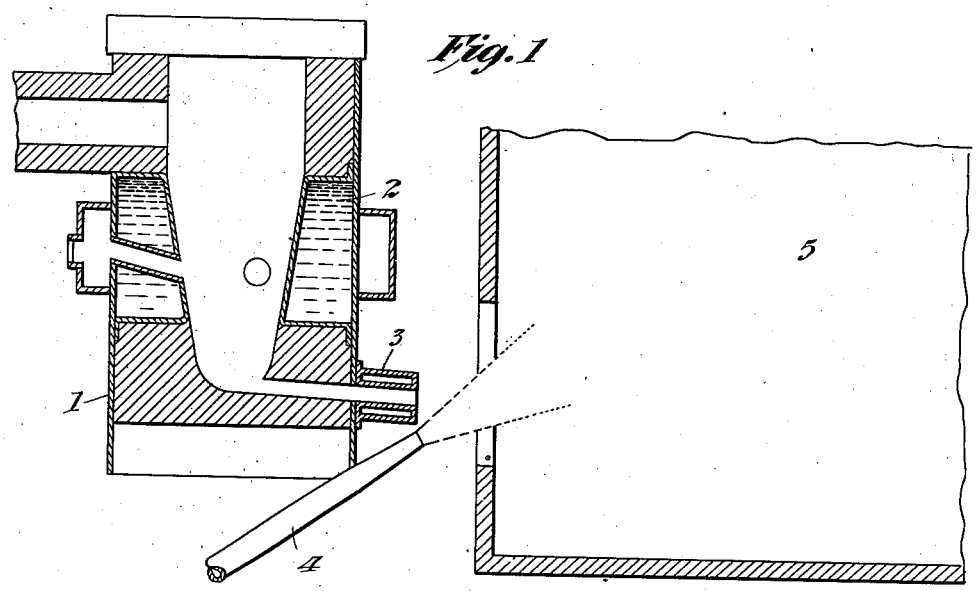
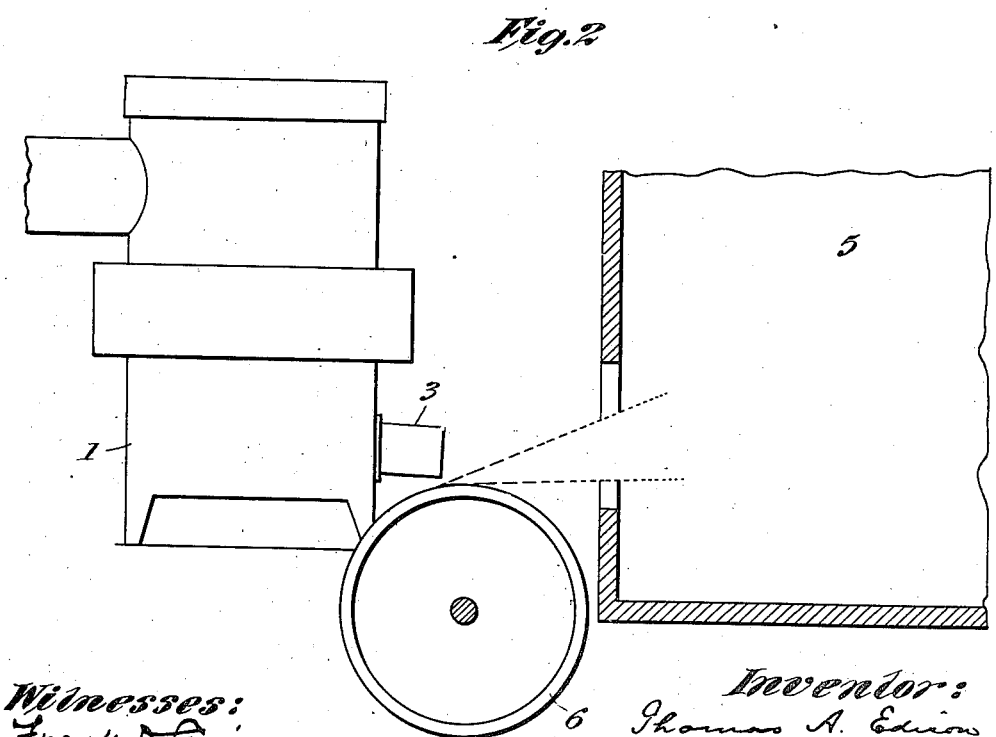
Witnesses:
Frank D. Lewis
Delos Holden
Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY.

MANUFACTURE OF PORTLAND CEMENT.

1,059,661.  Specification of Letters Patent.  Patented Apr. 22, 1913.

Application filed May 8, 1906. Serial No. 315,717.

*To all whom it may concern:*

Be it known that I, THOMAS A. EDISON, a citizen of the United States, residing at Llewellyn Park, Orange, county of Essex, and State of New Jersey, have invented certain new and useful Improvements in the Manufacture of Portland Cement, of which the following is a description.

My invention relates to an improved process for manufacturing Portland cement, and my object is the production of a process for the purpose which can be economically and effectively practised in localities where the conditions as to raw material are unfavorable for working by present methods.

In general, the invention consists in manufacturing artificially a cement making material similar in its chemical and physical properties to the best natural cement rock, as found for example, in eastern Pennsylvania and north-western New Jersey; said material being subsequently admixed with a proper proportion of limestone, and, after grinding, being burned in a cement kiln, as in modern cement-making processes.

Broadly speaking, the invention consists in forming a cement making material or natural cement rock (adapted to be intimately mixed with the proper proportion of limestone to result, after calcination, in the production of Portland cement), by slagging or fusing the correct proportions of silicious material, such as quartz, with a sufficiently low percentage of limestone, in the presence of alumina (for instance—clay) and iron, so as to thereby result in a very fluid slag, such fusion taking place in a suitable water-jacketed furnace for the purpose, the fluid slag being tapped off at the bottom of the furnace and being finely subdivided or disintegrated, for instance, by a powerful jet of compressed air or steam, or by centrifugal force. I find that it is possible to artificially make cement rock in this way at a sufficiently low temperature to enable the process to be carried on in an economical way and on an entirely practical scale, so that when the material is intimately added to finely powdered limestone and burned in a rotary kiln, or otherwise, Portland cement of excellent quality can be secured. While it would be possible to intimately mix proper proportions of raw materials (silica, alumina, iron and lime) as to result in Portland cement after burning in a rotary kiln, the expense of fine grinding the silicious ingredients, such as quartz, would more than offset the cost of the slagging operation which is therefore preferred.

I am of course aware that heretofore Portland cement has been made from slag obtained in the operation of blast furnaces, but with these latter processes, the slag is seldom suitable for the purpose and generally contains sulfur or other objectionable impurities, and even when the slag is capable of use for cement purposes, the resulting cement is very irregular in quality. With my improved process, the slag, instead of being an irregular and uncertain by-product, is the direct product of the operation, and hence the ingredients can be always selected so as to result in a perfect material free from objectionable impurities. The important consideration in the process is the use of a sufficiently low percentage of lime as to enable the slagging operation to be carried on at an economical temperature, while at the same time the resulting slag can be made extremely liquid and non-viscid, and hence can be readily blown or disintegrated into a fine powder. If it were attempted to add a sufficient amount of lime in the first instance to make Portland cement, the temperature required for its fusion would be from 2500 degrees to 3000 degrees Fahr., a temperature far too high to enable the operations to be carried on with any degree of commercial economy.

In order that the invention may be better understood, attention is directed to the accompanying drawing, forming part of this specification, and in which—

Figure 1 is a diagrammatic view of a water-jacketed furnace and settling chamber, illustrating the disintegration of the fluid slag by a blast of compressed air or steam, and Fig. 2, a similar view, illustrating the disintegration of the fluid slag by centrifugal force.

Similar parts are represented by the same numerals of reference.

In carrying the invention into effect, I introduce into the furnace 1, successive charges of cement making material, to which is added coal or coke in the proper amount to effect the fusion. Quartz may be employed as the source of silica, and clay as the source of alumina.

A small percentage of oxid of iron is also employed, as well as limestone, in sufficient amount to permit fusion at an economically low temperature. Suitable proportions are the following:—

SiO₂ ---------- 32%
CaO ---------- 50%
Fe and Al ---------- 13%
Mg, alkali, etc. ---------- 5%

These percentages of ingredients may, however, be varied, depending on the price of coal, and upon the amount of potash in the natural materials, the presence of potash serving to increase the fusibility of the slag. The materials containing these substances are broken up into lumps and are fed to the furnace with the proper amount of anthracite or coke in the usual manner. The furnace is provided with a water jacket 2, by which its walls will be kept at a comparatively low temperature, so as to cause an accumulation of slag to collect on the interior and thereby effectively prevent the same from burning out. The temperature necessary for fusion of the specific composition mentioned above is approximately 1800 degrees to 2000 degrees Fahr. As the material fuses the very liquid slag is tapped off through a pipe 3. The flow of the slag from the pipe 3 may be controlled by a plug of clay, in the usual way. The liquid as it falls, may be subjected to the effect of a powerful blast of compressed air or steam from a pipe 4, by which the liquid will be finely subdivided and blown into a large settling chamber 5, so as to deposit therein as a fine powder.

Instead of subdividing the liquid slag by a jet, as explained, it may be allowed to fall on a rapidly rotating wheel 6, by which it will be thrown off by centrifugal force into the settling chamber 5, and finely subdivided in this way. The fine powder deposited in the settling chamber is now intimately admixed with the proper proportion of powdered limestone to bring the lime contents up to the desired formula for Portland cement, and the chalk-like compound thus secured is then clinkered in a suitable rotary cement kiln, or otherwise. If desired, the material collected in the settling chamber, if not sufficiently fine and uniform, may be first ground and properly sized by screening or blowing, after which it may be then mixed with the powdered limestone.

Having now described my invention, what I claim as new and desire to secure by Letters Patent is as follows:—

1. The process of manufacturing Portland cement, which consists in fusing silicious and aluminous materials with limestone in such proportions as to result in fusion at a temperature less than 2500 degrees Fahr. and the production of an extremely liquid non-viscid slag of fixed proportions, in finely subdividing the slag thus obtained, in adding sufficient limestone to complete the final proportion of lime desired for the cement, and in finally calcining the mixture, substantially as set forth.

2. The process of manufacturing Portland cement, which consists in fusing silicious and aluminous materials with limestone in such proportions as to result in fusion at a temperature of approximately 2000 degrees Fahr. and the production of an extremely liquid non-viscid slag of fixed proportions, in finely subdividing the slag thus obtained, in adding sufficient limestone to complete the final proportion of lime desired for the cement, and in finally calcining the mixture, substantially as set forth.

3. The process of manufacturing Portland cement, which consists in fusing silicious and aluminous materials with limestone in such proportions as to result in an extremely liquid and non-viscid slag containing approximately 50% of lime, in finely subdividing the slag thus obtained, in adding sufficient limestone to complete the final proportion of lime desired for the cement, and in finally calcining the mixture, substantially as set forth.

4. The process of manufacturing Portland cement, which consists in fusing silicious and aluminous materials with limestone in such proportions as to result in fusion at a temperature less than 2500 degrees Fahr. and the production of an extremely liquid non-viscid slag containing approximately 50% of lime, in finely subdividing the slag thus obtained, in adding sufficient limestone to complete the final proportion of lime desired for the cement, and in finally calcining the mixture, substantially as set forth.

5. The process of manufacturing Portland cement, which consists in fusing silicious and aluminous materials with limestone in such proportions as to result in fusion at a temperature less than 2500 degrees Fahr. and the production of an extremely liquid non-viscid slag containing approximately 50% of lime, in subjecting the fluid slag to a powerful blast whereby it will be chilled and finely subdivided, in adding sufficient limestone to complete the final proportion of lime desired for the cement, and in finally calcining the mixture, substantially as set forth.

6. The process of manufacturing Portland cement, which consists in fusing silicious, aluminous, ferrous, and alkaline materials with limestone in such proportions as to result in fusion at a temperature less than 2500 degrees Fahr. and the production of an extremely liquid non-viscid slag of fixed proportions, in finely sub-dividing the slag thus obtained, in adding sufficient limestone to complete the final proportion of lime desired for cement, and in finally calcining the mixture, substantially as set forth.

7. The process of manufacturing Portland cement, which consists in fusing silicious, aluminous, ferrous, and suitable alkaline materials with limestone in such proportions as to result in the production of an extremely liquid non-viscid slag comprising materials in the following proportions: silica, approximately 32%; lime, approximately 50%; iron and aluminum, approximately 13% and magnesium, alkali, etc. approximately 5%, in finely sub-dividing the slag thus obtained, in adding sufficient limestone to complete the final proportion of lime desired for the cement, and in finally calcining the mixture, substantially as set forth.

This specification signed and witnessed this 7th day of May 1906.

THOMAS A. EDISON.

Witnesses:
 FRANK L. DYER,
 ANNA R. KLEHM.